(No Model.)
S. BROADBENT & S. BROADBENT THE YOUNGER.
ROTARY ENGINE.
No. 296,123. Patented Apr. 1, 1884.
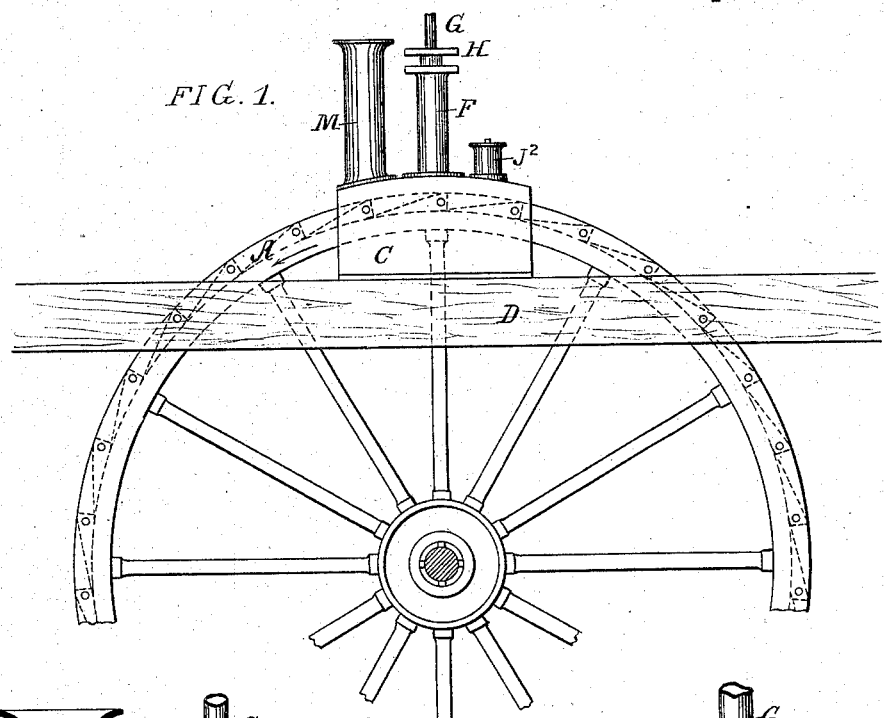
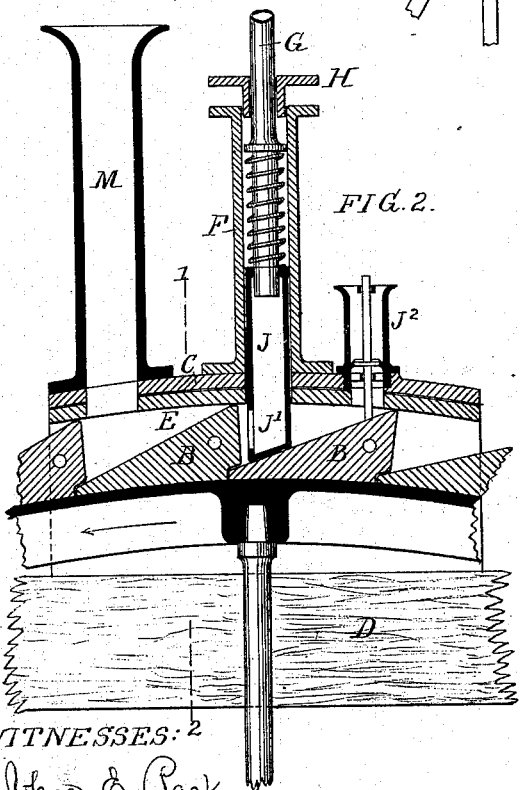
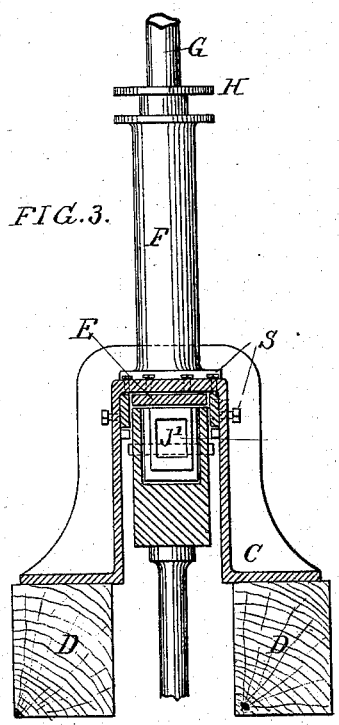
WITNESSES:
John E. Parker
James T. Tobin
INVENTORS:
S. Broadbent
S. Broadbent the Younger,
by their attys
Howson & Son ature fully decomposed into

UNITED STATES PATENT OFFICE.

SQUIRE BROADBENT AND SQUIRE BROADBENT THE YOUNGER, OF TONG, NEAR BRADFORD, COUNTY OF YORK, ENGLAND.

ROTARY ENGINE.

SPECIFICATION forming part of Letters Patent No. 296,123, dated April 1, 1884.

Application filed June 11, 1883. (No model.) Patented in England December 1, 1882, No. 5,735; in Belgium May 31, 1883, No. 61,556; in France June 1, 1883, No. 155,799, and in Germany June 15, 1883, No. 25,397.

*To all whom it may concern:*

Be it known that we, SQUIRE BROADBENT and SQUIRE BROADBENT the younger, subjects of the Queen of Great Britain and Ireland, and residing at Tong, near Bradford, in the county of York, England, have invented certain Improvements in Rotary Engines, (for which we have obtained British Patent No. 5,735, December 1, 1882,) of which the following is a specification.

Our invention consists of a simplified rotary engine to be driven by steam, compressed air, or water, as more fully described hereinafter.

In the accompanying drawings, Figure 1 is a side elevation of a portion of our improved rotary engine; Fig. 2, a section through the valves and a portion of the rotary wheel, drawn to a larger scale; and Fig. 3, a cross-section through line 1 2.

The rotary wheel is mounted upon a shaft supported by journals in the ordinary manner, and is provided at its periphery with flanges or shields A, turned true inside over the periphery and a portion of the outside. Between the said shields are fitted and secured a number of teeth, B, and covering for a certain distance the wheel and teeth is a curved bracket, C, supported by beams D D. Between the bracket and the wheel we place packing-plates E, which are adjusted by screws S to fit the periphery and sides of the shields A.

Secured to the bracket C is a valve-casing, F, to which the pressure-pipe G is connected, and made tight by means of stuffing-box and gland H. Around the lower portion of this pipe is mounted the hollow sliding valve, J, the bottom part of which is made angular to fit the incline of the teeth B, and the sides of the valve to fit between the shields A. The valve J is kept in contact with the teeth by means of a spiral spring placed between the top of the sliding valve and a collar on the pipe G. When the sliding valve is in the position as shown by Fig. 2, and the pressure admitted to the pipe G, the steam, compressed air, or water will act upon the face of the tooth, causing the wheel to move in the direction of the arrow, and as the latter rotates the valve J will slide up the incline of the tooth and close the valve-opening at J', thereby stopping the supply. When the sliding valve has mounted to the top of the tooth, the spiral spring will cause the valve to drop down to the bottom of the next tooth, thus reopening J' and admitting pressure to act on the next tooth, and so on continuously so long as the pressure is in the pipe G. The small valve $J^2$ at the back of the valve-casing F is acted upon in the same manner as the sliding valve J, by which any back-pressure is allowed to escape to the atmosphere, and the pipe M on the opposite side of J is so placed that as soon as the pressure from the hollow sliding valve acts upon another tooth the steam, compressed air, or water is allowed to escape from the space or tooth last acted upon.

In the drawings we have only shown one set of valves fitted to the wheel; but we wish it to be understood that more valves of the same construction may be placed around the circumference of the wheel, the number varying according to the power required.

We claim as our invention—

1. The combination of a rotary wheel having a series of inclined teeth, B, an inclosing-bracket, and valve-casing, with an inlet-pipe, G, stuffing-box H, hollow sliding valve J, into which the inlet-pipe extends, and a spring interposed between said valve and a collar on the pipe, substantially as set forth.

2. The combination of the rotary toothed wheel with a bracket, C, carrying inlet-pipe, sliding valve, exhaust-pipe, and valve $J^2$, as and for the purpose set forth.

In testimony whereof we have signed our names to this specification in the presence of two subscribing witnesses.

SQUIRE BROADBENT.
SQUIRE BROADBENT THE YOUNGER.

Witnesses:
 JOHN WAUGH,
 JOHN GILL.